United States Patent
Bigot

(10) Patent No.: US 10,527,080 B2
(45) Date of Patent: Jan. 7, 2020

(54) TEMPORARY FASTENER

(71) Applicant: LISI AEROSPACE, Paris (FR)

(72) Inventor: Frédéric Bigot, Reuilly (FR)

(73) Assignee: LISI AEROSPACE, Paris (FR)

(*) Notice: Subject to any disclaimer, the term of this patent is extended or adjusted under 35 U.S.C. 154(b) by 290 days.

(21) Appl. No.: 15/104,528

(22) PCT Filed: Dec. 15, 2014

(86) PCT No.: PCT/EP2014/077720
§ 371 (c)(1),
(2) Date: Jun. 15, 2016

(87) PCT Pub. No.: WO2015/091335
PCT Pub. Date: Jun. 25, 2015

(65) Prior Publication Data
US 2016/0312815 A1 Oct. 27, 2016

(30) Foreign Application Priority Data
Dec. 16, 2013 (FR) .................................. 13 62690

(51) Int. Cl.
*F16B 19/10* (2006.01)
*B23P 19/04* (2006.01)

(52) U.S. Cl.
CPC ............ *F16B 19/109* (2013.01); *B23P 19/04* (2013.01)

(58) Field of Classification Search
CPC ......... F16B 19/109; F16B 19/10; B23P 19/04
See application file for complete search history.

(56) References Cited

U.S. PATENT DOCUMENTS

| | | | | |
|---|---|---|---|---|
| 2,463,731 | A | * 3/1949 | Whalen | F16B 19/109 269/48.4 |
| 2,775,155 | A | * 12/1956 | Tompkins | B25B 31/005 269/48.3 |
| 3,233,504 | A | 2/1966 | Jones | |
| 3,260,151 | A | 7/1966 | Jones | |

(Continued)

FOREIGN PATENT DOCUMENTS

| FR | 2676258 A1 | 11/1992 |
|---|---|---|
| GB | 1327021 | 8/1973 |

OTHER PUBLICATIONS

Fritzen, Claas, WIPO, International Search Report, dated Feb. 13, 2015, 4 pages, European Patent Office.

*Primary Examiner* — Ryan J. Walters
*Assistant Examiner* — Lawrence Averick
(74) *Attorney, Agent, or Firm* — Henricks Slavin LLP

(57) ABSTRACT

The invention relates to a fastener (10) for the temporary assembly of at least two pre-drilled structures of the type comprising:
a body (11) able to come into contact with a face of the structures to be assembled;
a spacer (17), secured to said body;
two elastic half-clips (15), each clip having a hooking spur (16);
a mechanism that can be moved relative to the body, comprising a threaded rod (18) connected to the half-clips, and a control nut (20) mounted on said rod, the control nut comprising:
an internal tapping (19) cooperating with the thread (25) of the rod;
an external thread (26) cooperating with an internal tapping (28) of the body;
the body thread and the control nut thread being opposite handed.

7 Claims, 2 Drawing Sheets

(56) References Cited

U.S. PATENT DOCUMENTS

Figure 1:
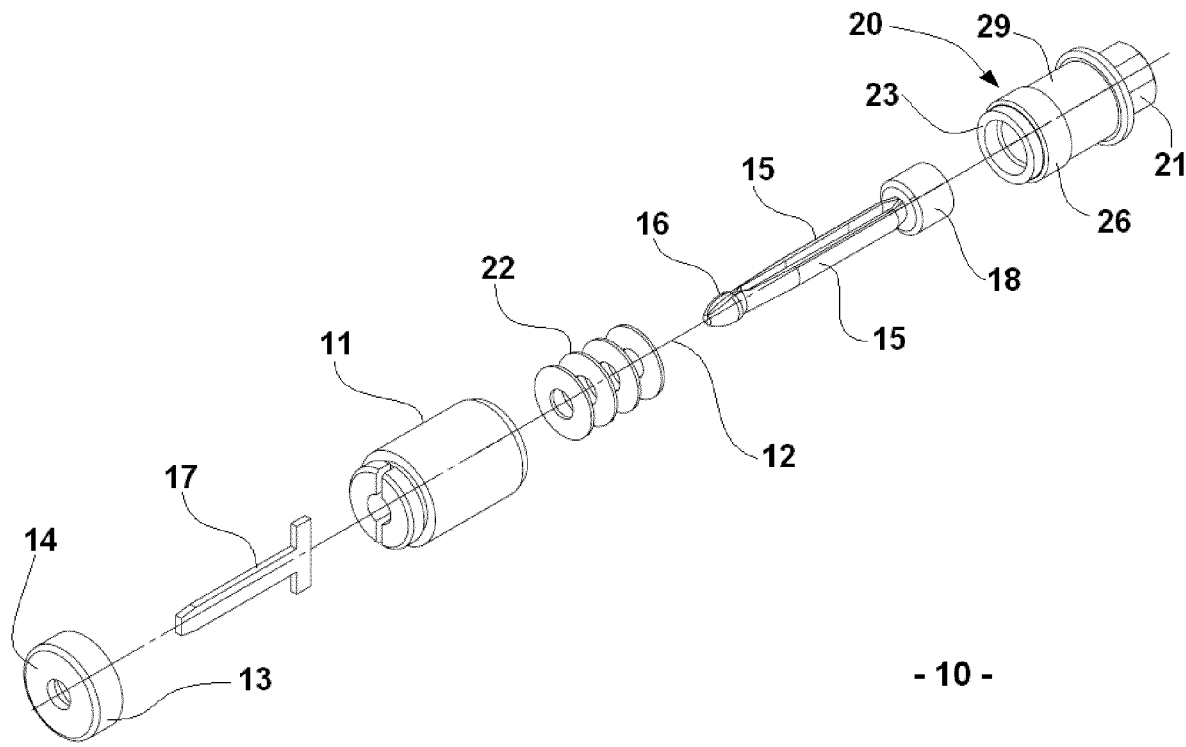

| | | | | |
|---|---|---|---|---|
| 4,537,542 A * | 8/1985 | Pratt | ..................... | B25B 31/005 |
| | | | | 24/607 |
| 4,787,274 A * | 11/1988 | Belanger | ............... | B25B 31/005 |
| | | | | 81/57.15 |
| 5,048,805 A * | 9/1991 | Wiseman | ................. | B21J 15/42 |
| | | | | 269/48.4 |
| 5,439,310 A * | 8/1995 | Evenson | ................ | B64G 1/641 |
| | | | | 403/18 |
| 7,048,266 B2 * | 5/2006 | Starr | ....................... | B21J 15/42 |
| | | | | 254/18 |
| 8,413,307 B2 * | 4/2013 | Katzenberger | ........... | B21J 15/10 |
| | | | | 29/240 |
| 2012/0233834 A1 * | 9/2012 | Szechinski | ............. | B23P 19/04 |
| | | | | 29/407.01 |

* cited by examiner

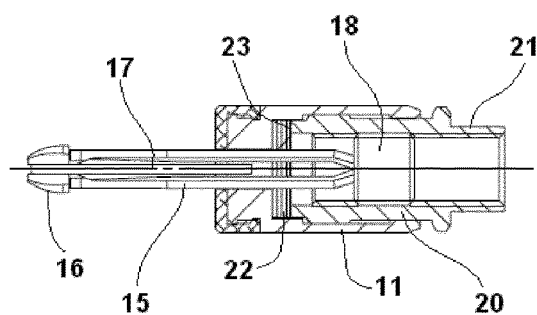
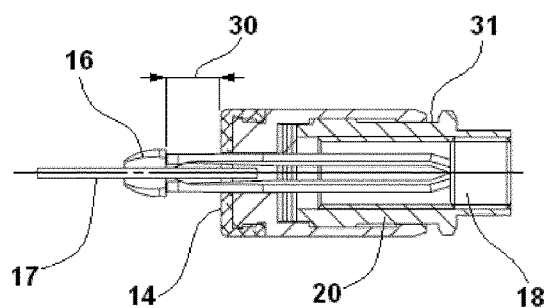
Fig. 3  Fig. 4
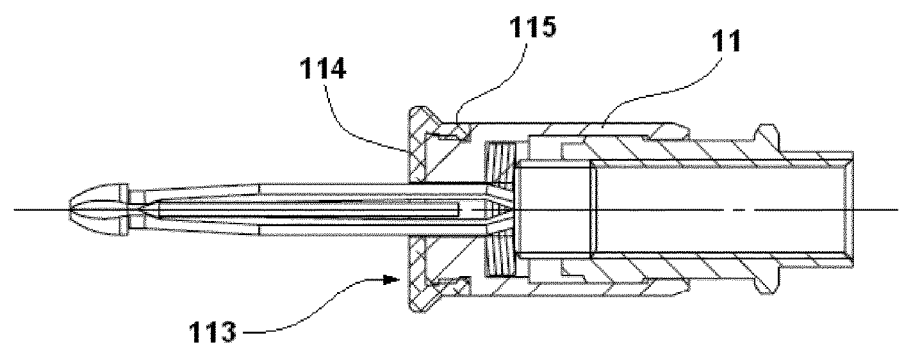
Fig. 5

TEMPORARY FASTENER

CROSS REFERENCE TO RELATED APPLICATIONS

This application is a National Stage of International Application No. PCT/EP2014/077720, filed Dec. 15, 2014, published as WO2015/091335, claiming priority of FR1365690, filed Dec. 16, 2013, the entire contents of which are incorporated herein by reference.

The present invention relates to temporary fasteners of the insertable clamp type.

In the aeronautical industry, before carrying out the final assembly of metal sheets or similar elements, it is known to carry out a temporary assembly of the sheets using temporary fasteners inserted into through holes.

Such temporary fasteners, e.g. those described in documents GB1327021 and U.S. Pat. No. 3,260,151, typically comprise the following:
- a body with a bearing face able to come into contact with a front face of the structures to be assembled;
- at least one clip, intended to go through the drilled holes, with a hooking spur that can be applied against a rear face of the structures to be assembled;
- a mechanism that can be moved relative to the body, comprising a threaded rod placed coaxially to the body, with one end of the rod extended by the clip, and a control nut screwed onto the other end of the rod.

This mechanism, via an initial movement of the threaded rod, makes it possible to shift the spurs from a "closed" position to an "open" position, so that the outer diameter formed is then greater than the diameter of the through-holes. Secondly, the movement makes it possible to apply tension to the metal sheets between the open spurs and the body's bearing surface.

These fasteners are generally fitted to the metal sheets using a motorized screwdriver type of device, equipped with a tool known as "nose equipment".

In order to automate the installation of the fasteners, the nose equipment should be allowed to move automatically between the various holes in the structures to be assembled. However, the nose equipment can be prevented from accessing a hole located between already-installed fasteners because of the dimensions of said fasteners. This causes malfunctions that require a technician to intervene and slow down the installation of the fasteners.

Consequently, the aim of the present invention is to provide a fastener with a small diameter and height, in order to assist the use of automatic installation tools.

The invention relates to a temporary fastener for the temporary assembly of at least two pre-drilled structures of the type comprising: a body extending along an axis, said body having a bearing surface substantially perpendicular to the axis, said surface being able to come into contact with a front surface of the structures to be assembled; a spacer, secured to said body; two elastic half-clips designed to pass through the holes, each clip having a hooking spur that can be applied to a rear surface of the structures to be assembled, the spacer being located between the two half-clips; a mechanism that can be moved relative to the body, said mechanism comprising a threaded rod placed coaxially to the body, with one end of said rod connected to the half-clips, said mechanism also comprising a control nut mounted on said rod; the control nut comprising: an internal tapping cooperating with the thread of the rod; an external thread cooperating with an internal tapping of the body; the rod thread and the nut thread being opposite hand threads.

"Opposite hand thread" means that the thread of the threaded rod and of the nut form helixes around the axis of the fastener, in opposite directions of rotation.

The purpose of the opposite hand threads is to enable the body and control nut to be assembled during the manufacture of the fastener, to provide the traction of the traction rod during the installation of the fastener, to stop the nut in translation during the removal of the fastener and thus stop the nut from coming out of the body. The combination of the nut thread and of the body tapping replaces a stopping element and allows the overall diameter of the fastener to be reduced, compared to other known devices, by moving the nut stopping function to the body of the fastener.

Preferably, one extremity of the nut is fitted with a driving portion able to cooperate with an installation tool for driving in rotation.

More preferably, the thread of the nut is arranged on the outer cylindrical perimeter of one extremity of the nut forming a stop, said extremity being opposite the driving portion.

Preferably, the tapping of the body is arranged on the inner cylindrical perimeter of an extremity opposite the bearing surface.

Preferably, the nut comprises a median portion with an outer diameter smaller than the smallest diameter of the tapping of the body.

Preferably, spring washers are fitted in the body, between an inner surface of said body, arranged substantially perpendicular to the axis, and the nut's stop.

The invention also relates to a method for temporarily assembling at least two pre-drilled structures comprising the following steps:
- a fastener such as described above is installed onto an installation machine;
- said machine inserts the two elastic half-clips into a hole in the structures to be assembled;
- a machine drive tool drives the control nut in rotation.

Automated installation is particularly helped by the dimensions of the fastener according to the invention.

Figure 2:
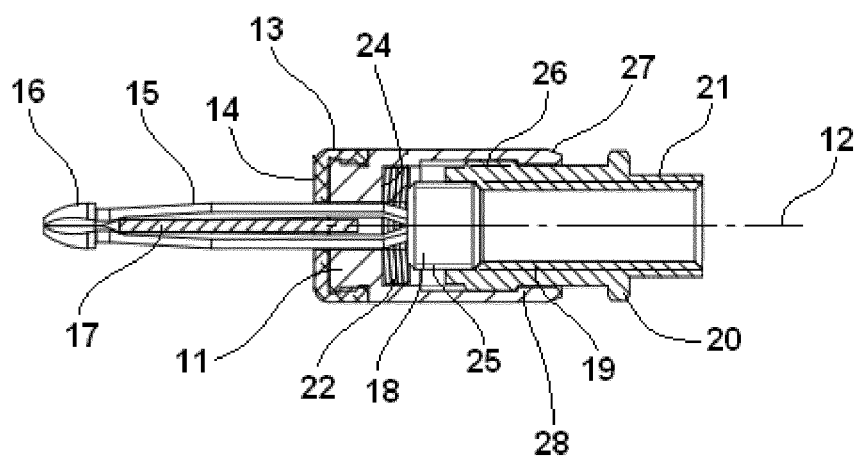

The invention will be better understood when reading the following description and examining the accompanying figures. These are provided for informational purposes only and do not exhaustively define the invention. The figures illustrate the following:

FIG. 1: An exploded view of a clamping fastener type of temporary fastener according to one embodiment of the invention;

FIG. 2: A cross-section view of the fastener of FIG. 1 at the start of an installation method according to one embodiment of the invention;

FIG. 3: A cross-section view of the fastener of FIG. 1 during an installation method according to one embodiment of the invention;

FIG. 4: A cross-section view of the fastener of FIG. 1 at the end of an installation method according to one embodiment of the invention;

FIG. 5: A view of a clamping fastener type of temporary fastener according to another embodiment of the invention.

FIG. 1 depicts an exploded view of a clamping fastener type of temporary fastener according to one embodiment of the invention. FIG. 2 depicts a cross-section view of the same fastener, assembled.

The fastener 10 comprises a substantially cylindrical body 11 arranged along an axis 12. One extremity of the body 11 along said axis is fitted with an end-fitting 13. Said end-fitting comprises a bearing surface 14, perpendicular to the axis 12, capable of coming into contact with one face of the elements to be assembled, such as drilled metal sheets.

The fastener 10 also comprises two elongated half-clips 15, each with a hooking spur 16 that can be applied against another face of the metal sheets to be assembled via lined-up holes in them.

A spacer 17 in the form of a fixed metal sheet is placed between the half-clips 15. The role of the spacer is to keep the spaced spurs in the open position. When the fastener is in the "free" or "closed" position, as shown in FIG. 2, the half-clips 15 extend outside the body 11, such that the hooking spurs 16 extend beyond the spacer and are in contact with each other.

The fastener 10 also comprises a threaded rod 18 arranged along the axis 12, which can be moved relative to the body 11. One end of the rod 18 is attached to the two half-clips 15.

The rod has threads 25 on its outer surface. On its inner surface, the control nut 20 comprises a tapping 19 able to cooperate with the thread 25 of the threaded rod 18, such that the rod can move along the length of the nut 20. In FIG. 2, in the "free" position, the thread of the rod 18 is not engaged with the tapping 19.

One extremity of the nut 20 opposite the half-clips 15 is fitted with a drive portion 21. The outer shape of said portion, comprising flat portions for example, lets an installation tool drive the nut. Portion 21 has, for example, a hexagonal shape, but can have other shapes.

In addition, spring washers 22 are arranged along the axis 12 between a front stop 23 of the nut, located at the extremity opposite the drive portion 21, and an inner stop 24 of the body 11, formed by a cylindrical bottom arranged substantially perpendicular to the axis 12.

The nut 20 also comprises a thread 26 arranged on the outer cylindrical perimeter near the front stop 23. This thread 26 is short and only comprises a few threads.

At one extremity 27 opposite the bottom 24, the body 11 comprises an inner tapping 28, able to cooperate with the thread 26 of the nut. The tapping 28 also comprise a small number of threads.

The thread 25 of the threaded rod and the thread 26 of the nut 20 match opposite screwing directions. In this example, the thread 25 of the threaded rod is clockwise, whereas the thread 26 of the nut is anti-clockwise.

Between the threaded annular portion of the front stop 23 and the drive portion 21, the nut comprises a cylindrical median portion 29 with an outer diameter smaller than the smallest diameter of the tapped portion of the body 11. Because of this, there is clearance that lets the nut 20 slide and turn within the body 11, over a travel limited on one side by the spring washers 22 and on the other side by the extremity 27 comprising the tapping 28.

The thread 26 of the nut and the tapping 28 of the body only mesh with each other during the assembly of the temporary fastener 10. Said assembly is realized as follows. Firstly, the spring washers 22 are inserted inside the body 11 until they make contact with the bottom. Then, the threaded rod 18 fitted with the two half-clips 15 is inserted into the body 11, until the half-clips 15 go through the spring washers 22. The spacer 17 is inserted between the half-clips and in a slit made in a front surface of the body 11, then the end-fitting 13 is clipped or screwed onto the body to prevent any movement of the spacer. One surface of the threaded rod 18 rests against the spring washers 22.

The nut 20 is screwed by hand into the body 11 in anticlockwise direction, meshing the thread 26 of the nut and the tapping 28 of the body 11. The nut 20 is screwed until the thread 26 no longer meshes with the tapping 28.

Thanks to the clearance between the median portion 29 of the nut and the threaded extremity 27 of the body, the nut 20 is pushed inside the body 11 until it comes into contact with the threaded rod 18.

Due to the positive clearance between the peaks of the threading of the thread 26 of the nut and the tapping 28 of the body, and to the opposite handed threads, the nut cannot be pulled out of the body while the fastener is being fitted into or removed from structures. Indeed, the fastener 10 can only be removed by hand, by pulling on the nut 20, so as to bring the thread 26 of the nut in contact with the thread 28 of the extremity 27 of the body, and by screwing the thread 26 on the tapping 28 in the clockwise direction.

A method for using the fastener 10 on a structure occurs, for example, as follows: the fastener 10 is introduced into a nose equipment (not shown) that blocks the body 11 for translation and rotation. The nose equipment is, for example, fitted to a robot that positions the fastener 10 on a structure (not shown) by inserting the half-clips 15 in a hole that goes through said structure.

The nose equipment is, for example, fitted with a drive key with a complementary shape to the surface 21 of the nut 20. The key exerts a pressure and drives the nut 20 in rotation along the axis 12 in the clockwise direction; the nut then moves in translation on the thread 25 in relation to the body 11, so as to bring the stop 23 of the nut into contact with the spring washers 22. In this position, the thread 26 of the nut and the tapping 28 of the body are not arranged in contact with each other, so they cannot mesh. Therefore, the nut 20 remains in the body 11.

The drive key continues driving the nut 20 in rotation, the tapping 19 of the nut being meshed with the thread 25 of the rod 18, said rod then moving inside the nut in the direction of the surface 21, as shown in FIG. 3.

The spacer 17 is then located between the spurs 16, the latter being then able to abut against a surface of the structure to be assembled. The tightening torque and the crushing of the spring washer 22 by the nut 20 makes it possible to apply a tension in the structural elements, said tension being parameterized beforehand on the installation tool.

In FIG. 4, the rod 18 is shown after it has traversed its maximum travel inside the nut 20. The spacing 30 between the spurs 16 and the surface 14 of the end-fitting 13 specifies the minimum thickness of a structure that can be assembled with the fastener 10. During the installation of the fastener 10, the thread 26 of the nut and the tapping 28 of the body are never in contact with each other, so that they cannot mesh. Therefore, the nut 20 remains in the body 11 throughout the installation.

To remove the fastener 10, the nose equipment is moved until the key comes into contact with the drive surface 21 of the nut. The key then drives the nut 20 in the anticlockwise direction, the body 11 being maintained fixed in rotation. Under the effect of the rotation exerted, the nut 20 slides into the body 11 until the thread 26 of the front stop comes into contact with the tapping 28 of the body 11. Because of the opposite handed threads, the nut comes to bear against the extremity of the body without the thread 26 and the tapping 28 meshing. The threaded rod is driven towards the front stop 23 of the nut. This movement brings back the spurs 16 beyond the spacer 17 such that they are touching and return to an outer diameter smaller than the through-hole in the structure.

The fastener can be removed from the hole and subsequently reused.

Because a stopping bead between the body and the nut has been eliminated, such a fastener 10 is more compact than most known similar devices and allows successive installations using manual or robotic tools over a tighter range of steps.

In addition, the shape of the fastener has a grasping groove 31 (FIG. 4) that is useful for cooperating with the tool during the phase of waiting for installation. This characteristic, as well as its cylindrical shape, facilitate its use with a robotic mechanism.

In a variant, the fastener may not comprise the spring washers 22.

FIG. 5 depicts a fastener 110 according to one variant embodiment of the invention. The fastener 110 comprises the same elements as the fastener 10 described above, except for the end-fitting 13. More specifically, the fastener 110 comprises an end-fitting 113 comprising a tubular portion 115 with an outer diameter identical to the body 11 of the fastener 110. The end-fitting 113 also comprises a flange 114 forming a bearing surface on a structure. The flange 114 is in the shape of a disc with a diameter greater than the diameter of the body 11. The cylindrical portion 115 comprises, on its inner surface, an annular projection that fits by clipping into annular groove made in the front extremity of the body 11.

The flange 114 provides a secure bearing for the installation tool on the fastener and improves the relocation of the fastener with robotic vision, because the flange is close to the structure to be assembled.

The invention claimed is:

1. Fastener for the temporary assembly of at least two pre-drilled structures, comprising the following:
   a body extending along an axis, said body having a bearing surface substantially perpendicular to the axis, said surface being able to come into contact with a front surface of the structures to be assembled;
   a spacer, secured to said body;
   two elastic half-clips designed to pass through holes in the structures, each clip having a hooking spur that can be applied to a rear surface of the structures to be assembled, the spacer being located between the two half-clips;
   a mechanism that can be moved relative to the body, said mechanism comprising a threaded rod placed coaxially to the body, with one end of said rod connected to the half-clips, said mechanism also comprising a control nut having control nut threads mounted on said rod;
   said fastener being characterized in that the control nut comprises:
   an internal tapping cooperating with threads of the rod;
   an external thread cooperating with an internal tapping of the body;
   the rod threads and of the nut threads being opposite handed.

2. Fastener according to claim 1, wherein one extremity of the nut is fitted with a driving portion able to cooperate with an installation tool for driving in rotation.

3. Fastener according to claim 2, wherein the thread of the nut is arranged on the outer cylindrical perimeter of one extremity of the nut forming a stop, said extremity being opposite the driving portion.

4. Fastener according to claim 3, wherein spring washers are fitted in the body, between an inner surface of the body, arranged substantially perpendicular to the axis, and the stop of the nut.

5. Fastener according to one of the preceding claims 1-4, wherein the tapping of the body is arranged on the inner cylindrical perimeter of an extremity opposite the bearing surface.

6. Fastener according to one of the preceding claims 1-4, wherein the nut comprises a median portion with an outer diameter smaller than the smallest diameter of the tapping of the body.

7. Method for temporarily assembling at least two pre-drilled structures comprising the following steps:
   a fastener according to one of the preceding claims 1-4 is installed onto an installation machine;
   said machine inserts the two elastic half-clips into a hole in the structures to be assembled;
   a machine drive tool drives the control nut in rotation.

\* \* \* \* \*